(12) United States Patent
Brauns

(10) Patent No.: US 8,323,491 B2
(45) Date of Patent: Dec. 4, 2012

(54) COMBINATION OF A DESALINATION PLANT AND A SALINITY GRADIENT POWER REVERSE ELECTRODIALYSIS PLANT AND USE THEREOF

(75) Inventor: Etienne Brauns, Mol (BE)

(73) Assignee: Vlaamse Instelling Voor Technologisch Onderzoek (VITO), Mol (BE)

( * ) Notice: Subject to any disclaimer, the term of this patent is extended or adjusted under 35 U.S.C. 154(b) by 1177 days.

(21) Appl. No.: 11/996,146

(22) PCT Filed: Jul. 19, 2006

(86) PCT No.: PCT/BE2006/000078
§ 371 (c)(1),
(2), (4) Date: May 15, 2008

(87) PCT Pub. No.: WO2007/009196
PCT Pub. Date: Jan. 25, 2007

(65) Prior Publication Data
US 2008/0230376 A1    Sep. 25, 2008

(30) Foreign Application Priority Data
Jul. 20, 2005 (EP) ..................................... 05447175

(51) Int. Cl.
*B01D 63/00* (2006.01)
*C02F 9/00* (2006.01)
*C25D 17/00* (2006.01)
*H01M 6/00* (2006.01)
*B01D 61/00* (2006.01)

(52) U.S. Cl. ..................... 210/257.2; 210/652; 210/175; 204/194; 204/523; 429/122

(58) Field of Classification Search .......... 210/652–651, 210/257.2, 175, 180, 195.2; 429/51, 50, 429/101, 122; 202/10; 204/194, 523
See application file for complete search history.

(56) References Cited

U.S. PATENT DOCUMENTS
3,978,344 A * 8/1976 Jellinek ......................... 290/1 R
(Continued)

FOREIGN PATENT DOCUMENTS
DE     100 52 918 A1    3/2002
(Continued)

OTHER PUBLICATIONS

Aaberg, Rolfe Jarle. "Osmotic power, a new and powerful enegery source?." *REFOCUS* Nov./Dec. 2003: 48-49.

(Continued)

*Primary Examiner* — Ana Fortuna
(74) *Attorney, Agent, or Firm* — Merchant & Gould P.C.

(57) ABSTRACT

A desalination plant, includes a sea water intake, a desalination unit having a reverse osmosis or a thermal desalination unit, a fresh water outlet and a brine outlet. The plant also includes a salinity gradient power unit having a brine inlet, a seawater inlet and a mixed water outlet. The brine outlet is connected to the brine inlet and the salinity gradient power unit is arranged to generate an electrical current. A solar power heater is between the brine outlet and the brine inlet. A method for reducing the power consumption of a desalination plant providing fresh water and brine from sea water, includes a first step of providing a salinity gradient power unit, a next step of feeding the salinity gradient power unit with brine from the desalination plant as high salinity feed and sea water as low salinity feed. A subsequent step heats the brine with solar power prior to feeding the brine to the salinity gradient power unit, followed by the steps of generating an electrical current in the salinity gradient power unit and using the electrical current as an energy source for the desalination plant.

6 Claims, 1 Drawing Sheet

U.S. PATENT DOCUMENTS

| | | | |
|---|---|---|---|
| 4,083,781 A * | 4/1978 | Conger | 210/651 |
| 4,171,409 A | 10/1979 | Loeb | |
| 4,283,913 A * | 8/1981 | Loeb | 60/641.9 |
| 6,030,535 A * | 2/2000 | Hayashi et al. | 210/652 |
| 7,736,791 B1 * | 6/2010 | Merz | 429/51 |
| 7,744,760 B2 * | 6/2010 | Wilkins et al. | 210/652 |
| 2011/0011802 A1 * | 1/2011 | Maydan | 210/652 |

FOREIGN PATENT DOCUMENTS

| | | |
|---|---|---|
| DE | 101 51 904 A1 | 5/2003 |
| EP | 0 258 979 A1 | 3/1988 |
| GB | 2 194 855 A | 3/1988 |
| GB | 2 195 818 A | 4/1988 |

OTHER PUBLICATIONS

Loeb, Sidney. "Large-scale power production by pressure-retarded osmosis, using river water and sea water passing through spiral modules." *Desalination* 143(2002): 115-122.

Weinstein, John N.. "Electric power from differences in salinity: The dialytic battery." *Science* 191(1976): 557-559.

E. Brauns, An alternative hybrid concept combining seawater desalination, solar energy and reverse electrodialysis for a sustainable production of sweet water and eletrical energy, *Desalination and Water Treatment*, Jan. 2010.

\* cited by examiner

US 8,323,491 B2

COMBINATION OF A DESALINATION PLANT AND A SALINITY GRADIENT POWER REVERSE ELECTRODIALYSIS PLANT AND USE THEREOF

This application is a 371 of PCT/BE06/00078, file on Jul. 19, 2006, which claims priority of EP 05447175.0 filed on Jul. 20, 2005.

FIELD OF THE INVENTION

The present invention is related to production of energy using a salinity gradient. The invention is also related to the reduction of the net energy used in desalinating water.

STATE OF THE ART

It is well known that salinity gradient power can be produced by different approaches. This has been published in the patent literature and the scientific literature. The term "dialytical battery" is identical to the term "reversal electrodialysis".

John N. Weinstein ("Electric power from differences in salinity: the dialytic battery", Science, vol. 191, February 1976, pp 557-559) describes the principle of the "dialytic battery" and introduces in the article the power equation related to such battery. He converted an electrodialysis stack into a dialytic battery and experimental work was done with sodium chloride solutions. A "sea water" solution of 0.57 M of NaCl was tested against various "river water"-like low concentrations of NaCl solutions.

Sidney Loeb ("Large-scale power production by pressure-retarded osmosis, using river water and sea water passing through spiral modules", Desalination 143 (2002) 115-122) describes the principle of PRO (pressure retarded osmosis) by using seawater and (reverse) osmosis membranes. In PRO the high osmotic pressure of the sea water is used to induce, by osmosis, river water to diffuse through the membrane into the seawater. The energy from the flux of water through the membrane is extracted by a hydroturbine, driving an electrical generator.

Rolfe Jarle Aaberg ("Osmotic Power, a new and powerful renewable energy source", REFOCUS, November/December 2003, pp. 48-49) describes a project at Statkraft in Norway with respect to the possibility of extracting energy from river water and seawater. The concept is also based on membranes and the flow by osmosis of fresh water through the membranes into the seawater. A hydroturbine is activated by this flow and is therefore capable of driving a generator in order to produce electrical energy.

U.S. Pat. No. 4,171,409 describes a system by which electrical energy is produced from a concentrated ionic solution and a dilute ionic solution through reversal electrodialysis. The concentrated and dilute ionic solutions are regenerated afterwards by thermal separation from the solutions.

Patent application GB 2194855 describes a system by which seawater is collected during a high tide period, in a reservoir. The seawater is used in a reversal electrodialysis unit to produce electrical energy but is able to flow from the reservoir through the unit by gravitational forces, in a way pumping energy is not needed.

Patent application GB 2195818 also describes the increase in production of electrical energy from seawater, fresh water (near a river estuary) and a reversal electrodialysis unit by using waste heat from power station, oil refinery or chemical works. The waste heat is used to increase the temperature of the fluids. The voltage produced by the reversal electrodialysis unit increases with an increased temperature.

European patent application 0 258 979 describes an "Apparatus for simultaneous heat and mass transfer" as a multipurpose evaporating device. It is indicated in the patent that such an evaporator could be connected to a Pressure Retarded Osmosis (PRO) device or a Reversed Electrodialysis (RE) device. However, such a configuration is described as a closed circuit system in which a salt solution is used over and over again to be concentrated in the evaporator and diluted in the PRO or RE apparatus in order to produce energy. Such an indirect method of electricity production in a closed loop system therefore is considered here to be not very efficient and not economic in practice.

Patent DE 100 52 918 A 1 describes the use of organic materials being converted to gas, by biological processes, as a combustion fuel for an electricity generator. Such a configuration is able to produce electricity for driving the electrical motors of the pumps of a reverse osmosis desalination plant.

Application DE 101 51 904 A 1 describes a system which uses solar energy for the desalination of seawater and the production of electrical energy.

U.S. Pat. No. 4,171,109 describes the use of a reverse electrodialysis system to generate electricity from a solution at a high salt concentration and a solution at a low salt concentration level. Both solutions are regenerated by thermal separation and sent back to the reverse electrodialysis unit.

Most of the described installations are not viable due to installation (investment) costs and operational costs. No convenient setup without the need for high-capacity pumps for bringing high salt solutions near river water or vice versa is proposed. Such pumps consume too much energy for the salinity gradient power system to be economically viable. In a lot of areas, access to river water is very difficult or even impossible near the sea.

In countries with restricted sources of natural fresh water, e.g. countries in the Middle East, potable water is produced from seawater by reverse osmosis (RO) (pressure driven membrane filtration using reverse osmosis membranes) or by thermal technology (evaporation by MSF, MED, . . . ). These techniques require large amounts of energy in order to separate the salt from the seawater.

Electrical energy is used to drive the high pressure pumps of reverse osmosis installations. Such electrical energy is produced by e.g. classic thermal power plants by burning valuable oil as a heat energy source.

Thermal desalination technology (evaporation) is also very energy-demanding and consumes also important amounts of oil as a heat energy source. Moreover, in both cases large quantities of "greenhouse effect" gases such as $CO_2$ are also released in this way.

As a result, a method which allows for an important reduction of the energy/oil consumption during desalination, is very important. By the reduction of the oil consumption also the disposal of green house gases is reduced in a significant way.

AIMS OF THE INVENTION

The present invention aims to provide an apparatus and method for reducing the net energy consumption during a desalination process. A further aim is to provide a viable salinity gradient power plant.

SUMMARY OF THE INVENTION

The present invention concerns a desalination plant, comprising a sea water intake, a desalination unit comprising a reverse osmosis or a thermal desalination unit, a fresh water outlet and a brine outlet, characterised in that it further comprises a salinity gradient power unit comprising a brine inlet, a seawater inlet and a mixed water outlet, wherein said brine outlet of said desalination unit is connected to said brine inlet of said salinity gradient power unit and said salinity gradient power unit is arranged to generate an electrical current.

The desalination plant of the present invention preferably further comprises a solar power heater between the brine outlet of the desalination unit and the brine inlet of the salinity gradient power unit. A warmer feed will allow a higher power output from the salinity gradient power unit.

A thermal desalination unit may comprise the (additional or sole) use of solar energy. Since it is e.g. possible to evaporate seawater (also in e.g. simple salt pans) by solar energy and collect potable water through condensation of the moist air, it is therefore also possible to collect from such a solar power driven desalination unit the concentrated salt solution as brine, needed by the salinity gradient power unit. To give an indication of the large amount of solar power which is available in e.g. Arabic countries it can be mentioned that the solar peak power per $m^2$ can attain 1000 $W/m^2$. By assuming a mean value of only 200 $W/m^2$ during 24 hours in order to get some (indicative) idea of the massive evaporative power of the solar energy it is obvious that a salt pan of 1000 m×1000 m in surface area constitutes about roughly 200 MW under such conditions with a peak solar incoming power of 1000 MW.

The desalination plant can further comprise between the brine outlet and the brine inlet an additional solar power evaporator. An even more concentrated brine allows for a smaller salinity gradient power unit or a higher power output thereof.

Another aspect of the present invention concerns a method for reducing the power consumption (pumps etc. . . . ) of a desalination plant providing fresh water and brine from sea water, comprising the steps of:
  providing a salinity gradient power unit,
  feeding said salinity gradient power unit with brine from said desalination plant as high salinity feed and with a low salinity feed,
  generate an electrical current in said salinity gradient power unit, and
  using said electrical current as an energy source for said desalination plant.

Preferably, the brine is heated further with solar power prior to feeding the brine to the salinity gradient power unit.

Also, water can be evaporated from the brine using solar power, obtaining an even higher concentration of the brine, which can be fed to the salinity gradient power unit.

The low salinity feed is preferably seawater or a mixture of seawater and fresh water obtained in the desalination plant.

SHORT DESCRIPTION OF THE DRAWINGS

DETAILED DESCRIPTION OF THE INVENTION

Figure 1:
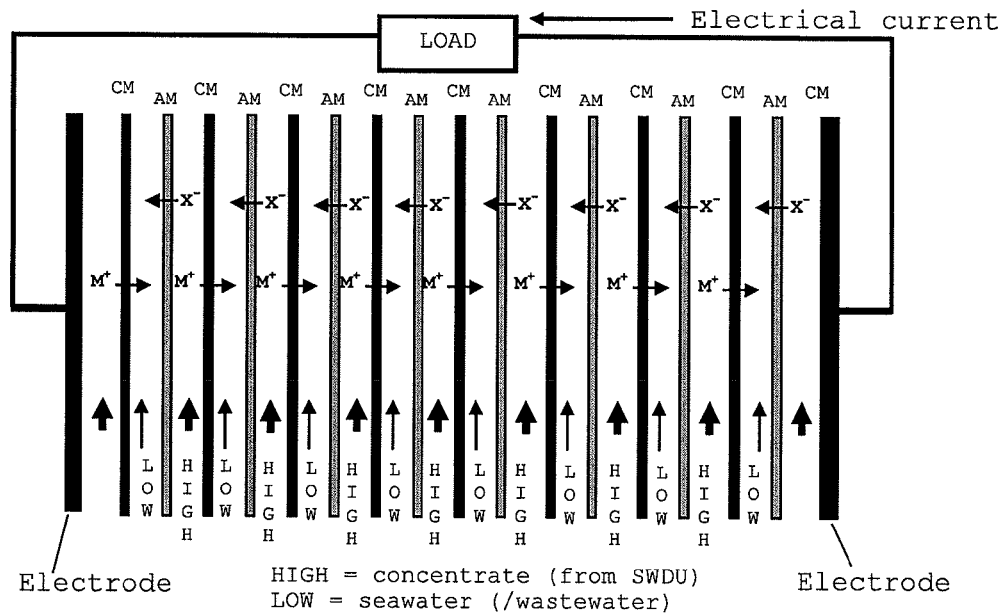
FIG. 1 represents a schematic set-up of a SGP-RE according to the present invention.

The possibility to produce energy by a salinity gradient power (SGP) concept can be illustrated from the osmotic pressure of a salt solution (seawater). Depending from the local seawater salt concentrations, an osmotic pressure of 20 to 25 bar is typical. A pressure of 20 bar corresponds to a water column with a height of 200 meters. This osmotic energy content of 1 $m^3$ of seawater therefore can be visualized also as the potential energy of 1 $m^3$ of water, lifted to a height of 100 meters (halfway the column of 200 metres in order to represent the average potential energy of 1 $m^3$ for all 200 m of water in the column).

This potential energy $E_p$ (Joule) within 1 $m^3$ of seawater (simplified to have a mass of 1000 kg) can be calculated from $$E_p = m.g.h$$

m=mass (kg)
  g=gravitational constant (9.81 $m/sec^2$)
  h=height (m)

To simplify the estimation of $E_p$, a value of 10 $m/sec^2$ is taken for "g" and the estimated value of $E_p$ then is 1000000 Joule (1 MJ) per $m^3$ of seawater. If this energy content of 1 $m^3$ of seawater would be extracted within 1 sec, the SGP therefore would be 1 MW per $m^3$ of seawater. This value of 1 MW per $m^3$ of seawater is also indicated in the literature on osmotic power.

Seawater typically contains about 35 grams of salt per liter of seawater (the concentration can be different/higher from location to location). Desalination technologies such as e.g. RO and MSF split the seawater into two fractions: one fraction of water which contains only a low concentration of salt and which can be used as drinking water and one fraction, called brine or concentrate, which has a high concentration of salt. During e.g. RO the recovery is typically 50%:2 $m^3$ of seawater is split into 1 $m^3$ of potable water and 1 $m^3$ of brine. The concentration of salt in the brine is therefore about the double of the salt concentration in seawater. As a result there is a salinity concentration difference of e.g. about 35 grams of salt between the brine and seawater. This situation resembles strongly to the salinity concentration difference between seawater and fresh water.

Since most of the desalination energy is stored in the brine, a salinity gradient power reversal electrodialysis (SGP-RE) is able to regain some of the energy stored in the brine through the difference in the salt concentration of the SWDU concentrate and seawater.

The present suggested novel method is based on SGP-RE and therefore introduces an innovative concept by combining two units:
  Unit I: an existing seawater desalination unit (SWDU) which produces desalinated water from seawater and a concentrate (brine) with a high salt concentration. Desalination units in the Middle East or other countries with a sea shore are mostly based on multiple stage flash (MSF) or reverse osmosis (RO) installations. MSF and RO account for roughly 85% of all such desalination installations for the moment. The remaining desalination units are also based on thermal evaporation concepts like e.g. MED (multiple effect distillation) and could also be partly or entirely based on solar energy.
  Unit II: a SGP-RE (salinity gradient power reversal electrodialysis) which obtains the concentrate from the SWDU as the high salinity feed and uses seawater as the low salinity feed (or wastewater effluent if available in a sufficient quantity nearby the SWDU location). As an example, when having a SWDU concentrate with about 70 to 80 grams of salt per liter and seawater with about 35 to 40 grams of salt per liter the osmotic pressure difference between both feeds equals about the osmotic pressure of seawater and fresh water. Therefore about the same energy can be extracted with the concentrate/seawater combination as with the seawater/fresh water combination. There is no necessity for water transport as the brine and the seawater are both already present at the first unit (desalination unit).

EXAMPLE

The SGP-RE unit consists of a set-up as used in electrodialysis (ED) but used in a reversed way. In such a set-up cation membranes (CM) and anion membranes (AM) are placed in an alternating sequence as indicated schematically in FIG. 1. Since the activity (concentration) of the salt ions in the SWDU concentrate (feed indicated as HIGH in the SGP-RE compartments) is much higher than the activity of the salt ions in the seawater (feed indicated as LOW in the SGP-RE compartments), there will be a diffusion of:

cations from the SWDU concentrate (HIGH) compartments through the cation membranes into the seawater (LOW) compartments anions from the SWDU concentrate (HIGH) compartments through the anion membranes into the seawater (LOW) compartments This diffusion of ions invokes an electrical voltage across the two SGP-RE electrodes and thus an electrical current through an electrical load. In FIG. 1 the electrode activity is not indicated. As with ED, the electrode electrolyte (hydraulic circuit) and the electrodes need also a specific approach in an SGP-RE setup in order to ensure a proper transport of electrons. It can be remarked that there is a benefit with respect to material transport when comparing the SGP-RE with the pressure-retarded osmosis (PRO) concept. With PRO water is transported through the osmosis membranes while the salt is not transported. Therefore the material ($H_2O$) transport in PRO through the membranes is massive. In SGP-RE however, only the anions are transported through the anion membranes and likewise only the cations are transported through the cation membranes. As a result, in SGP-RE the material transport through the membranes is limited.

Figure 2:
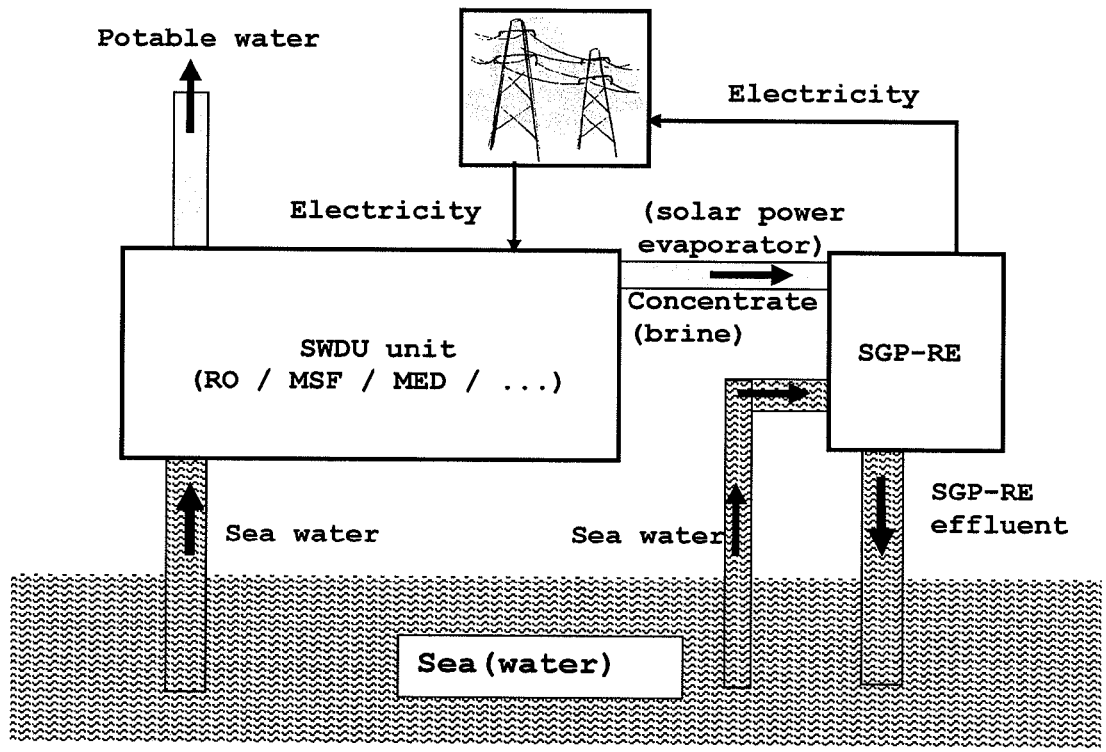
FIG. 2 represents a combination of an SWDU unit and an SGP-RE unit according to the present invention

In FIG. 2, the innovative concept by combining the SWDU and the SGP-RE unit is illustrated in principle. The SWDU extracts salt water from the sea and produces (potable) water with a very low salt concentration and brine with a very high salt concentration. The brine is delivered by the SWDU to the SGP-RE unit as the high salinity concentration medium. The SGP-RE unit can conveniently use sea water as the "low" salinity concentration medium. In the case of predominant use of solar energy in the SWDA, it is also possible to use (part of) the presumably abundant SWDU fresh water output (with very low salt concentration) and mix it with the sea water as a feed for the SGP-RE as the "low" concentration medium. This would lower the concentration of the "low" salinity concentration feed of the SGP-RE unit significantly and therefore increase the electricity production of the SGP-RE unit considerably. The SGP-RE produces electricity and delivers it to the electricity network. This energy can also be used (partly) by the SWDU.

From the diffusion of the salt ions out of the SWDU brine through the SGP-RE unit membranes into the low salinity concentration feed of the SGP-RE unit, the SWDU brine salt concentration is decreasing in the SGP-RE unit and the salt concentration of the low salinity concentration feed of the SGP-RE unit is increasing. Both solutions coming out of the SGP-RE can be mixed into one main outlet mixture solution. The resulting salt concentration of this outlet mixture is dictated by the ratio of the flow values of the SWDU concentrate and the SGPR-RE seawater flow. This ratio is a SGP-RE parameter.

The novel approach of the indicated combination of a SWDU and a SGP-RE is claimed as a new method to generate electrical energy which can be extracted from the SWDU concentrate (high salt ion activity/concentration). This energy would be lost, when the SWDU concentrate is disposed as an SWDU effluent, possibly in the sea. The recovery of this energy through the SGP-RE unit enables to lower considerably the amount of energy needed by the SWDU for the desalination of the seawater. With a surplus input of solar energy, the energy balance can even be (largely) positive.

With a SWDU based on RO, the electrical energy from the SGP-RE can be used by the electrical motors driving the high pressure pumps. With a SWDU based on a MSF the electrical energy from the SGP-RE can be used to either generate heat in the SWDU or either can be introduced in the local electricity network for other purposes. In either way, a large amount of energy can be saved (or even produced in excess) and therefore also important amounts of fossil fuels, such as e.g. oil for the heating purposes within the MSF installation. Those fuels can then be made available for other applications. Since the SGP-RE can be installed at the same location of the SWDU, at the seaside, such an integration of both installations is very attractive. There is e.g. no need of long distance transport of the SGP-RE feeds since the concentrate and seawater are available at the same location.

Next to the energy (fuel) savings, there will be a reduction of the $CO_2$ emission (and other combustion gases) since during the SGP-RE energy production there is no emission of such gasses.

The suggested new method could even be improved if the salt concentration of the SWDU concentrate would be increased further by e.g. natural evaporation in open air basins (or specifically designed systems) through solar energy. Solar energy conditions are favourable in the Middle East region. By further increasing the SWDU brine salt concentration by using the sun's radiation energy, the salinity gradient in the SGP-RE can be increased accordingly and therefore also the available energy per $m^3$ of concentrate. This would allow either for a smaller scaled SGP-RE installation or a higher power output.

In the case the brine from a thermal SWDU has an increased temperature, this could be used to the advantage of a higher ion diffusion rate in the SGP-RE and therefore a higher power output of the SGP-RE. Solar energy could also be used for increasing the temperature to improve the ion diffusion rate and thus the performance of the SGPR-RE.

The invention claimed is:

1. A desalination plant, comprising:
   a sea water intake,
   a desalination unit comprising a reverse osmosis unit having the sea water intake as an input and a fresh water outlet and a brine outlet as outputs,
   a salinity gradient power unit arranged to generate an electrical current by reverse electrodialysis comprising:
   a setup formed by two electrodes with an alternating sequence of cation membranes and anion membranes interposed between the two electrodes,
   a brine inlet forming a high salinity feed,
   a seawater inlet forming a low salinity feed, and
   a mixed water outlet,
   wherein said brine outlet of said desalination unit is connected to said brine inlet of said salinity gradient power unit, and wherein a solar power heater is comprised between the brine outlet and the brine inlet.

2. The desalination plant of claim 1, further comprising between the brine outlet and the brine inlet a solar power evaporator.

3. The method of claim 1, wherein the low salinity feed is seawater.

4. The method of claim 1, wherein the low salinity feed is a mixture of seawater and fresh water obtained from the desalination plant.

5. The desalination plant of claim 1, wherein the low salinity feed is formed by a mixture of seawater obtained from the seawater inlet and fresh water obtained from the desalination plant.

6. The desalination plant of claim 1, wherein the high salinity feed and the low salinity feed, after having been discharged from the salinity gradient power unit, are mixed to form the mixed water outlet.

\* \* \* \* \*